United States Patent [19]

Donovan

[11] Patent Number: 4,748,741
[45] Date of Patent: Jun. 7, 1988

[54] PIN INSERTION APPARATUS AND METHOD OF INSERTING PINS

[75] Inventor: Paul G. Donovan, Palm Beach Gardens, Fla.

[73] Assignee: Northern Telecom Limited, Montreal, Canada

[21] Appl. No.: 33,058

[22] Filed: Mar. 31, 1987

[51] Int. Cl.⁴ .................. H01R 9/09; B23P 19/00
[52] U.S. Cl. ........................... 29/843; 29/845; 29/739; 227/104
[58] Field of Search ............ 29/845, 739, 842, 843; 227/99, 104

[56] References Cited

U.S. PATENT DOCUMENTS

| | | | |
|---|---|---|---|
| 3,307,244 | 3/1967 | De Shong | 29/739 X |
| 3,699,631 | 10/1972 | Shughart | 29/739 X |
| 3,765,075 | 10/1973 | Olney, Jr. et al. | 29/739 X |
| 3,932,931 | 1/1976 | Wright | 29/739 X |
| 3,938,245 | 2/1976 | Lovendusky et al. | 29/739 X |
| 3,939,542 | 2/1976 | Reggi | 29/739 X |
| 4,058,881 | 11/1977 | Gavin et al. | 29/739 X |
| 4,265,013 | 5/1981 | Brown et al. | 79/845 X |
| 4,333,233 | 6/1982 | Dodson et al. | 29/739 X |
| 4,513,498 | 4/1985 | Kent | 29/845 |

Primary Examiner—Howard N. Goldberg
Assistant Examiner—Carl J. Arbes
Attorney, Agent, or Firm—Foley & Lardner, Schwartz, Jeffery, Schwaab, Mack, Blumenthal & Evans

[57] ABSTRACT

Pins are inserted sequentially into a component by an insertion punch. A shuttle reciprocally mounted to move in a direction normal to the movement of a punch, moves pins to a position for insertion. In one form of apparatus, pins are fed singly to the shuttle at a loading position, the shuttle then moving to a dispensing position where the punch grips the pin, removes it from the shuttle and inserts it. While moving from the loading position to the dispensing position, the pin can pass beneath a solder preform station at which an annular preform is placed over the pin. In an alternative arrangement, pins are mounted on a bandolier and moved by the shuttle. Pins are removed one at a time from the bandolier and inserted by the insertion punch.

16 Claims, 10 Drawing Sheets

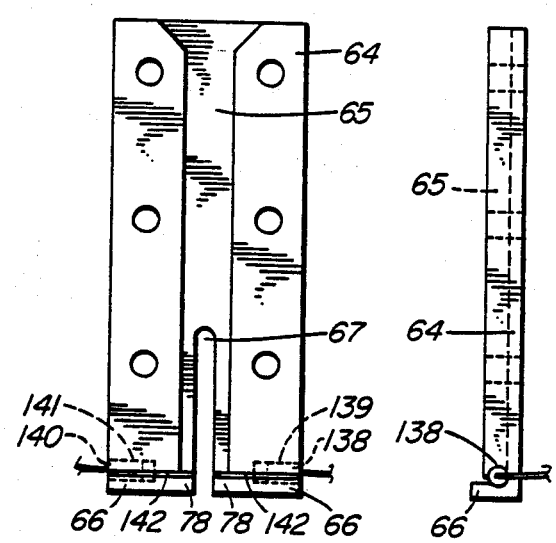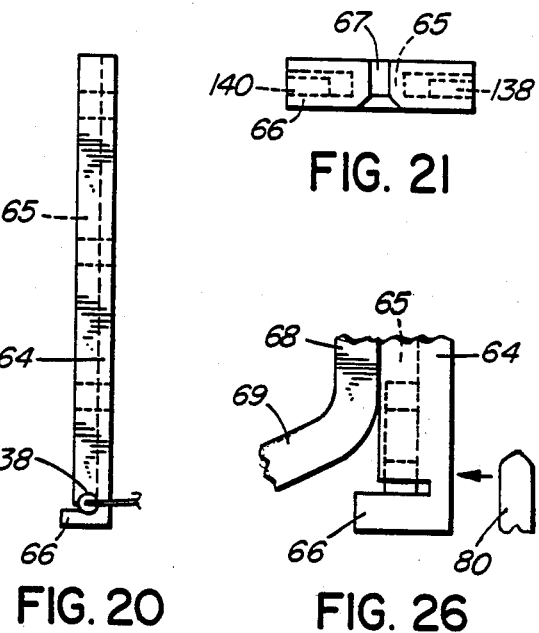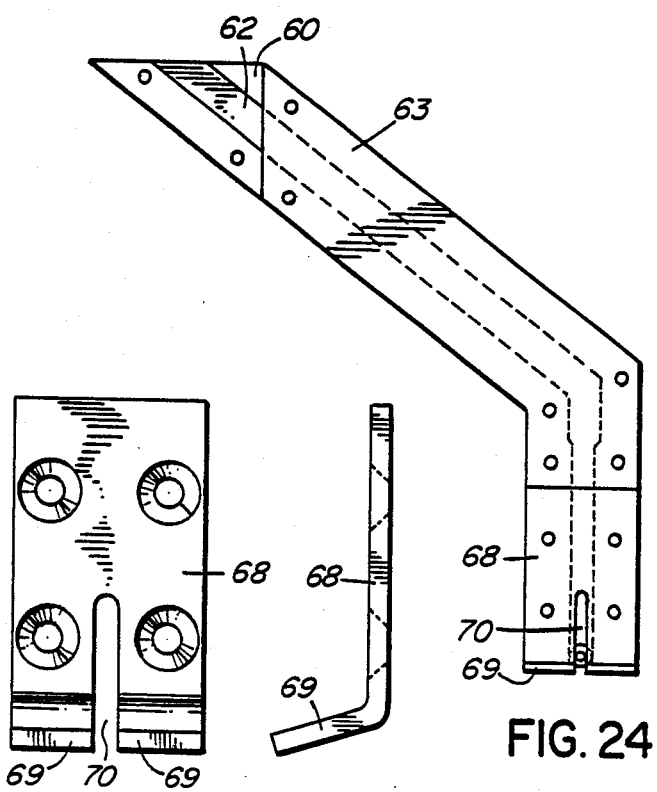
FIG. 19  FIG. 20  FIG. 26
FIG. 22  FIG. 23  FIG. 24  FIG. 25  FIG. 21

PIN INSERTION APPARATUS AND METHOD OF INSERTING PINS

BACKGROUND OF THE INVENTION

1. Field of the Invention

This invention relates to pin inserting apparatus, and is particularly concerned with the insertion of pins in telecommunications apparatus, such as backplanes.

2. Related Art

Backplanes, and other forms of connectors as used in telecommunications systems, require large numbers of relatively long and thin contact pins to be inserted into a connector member. Large numbers of such connectors are used. There is a requirement that the pins be inserted accurately and at very high rates to keep costs to a minimum.

Terminal pins are often not symmetrical about a midpoint in their length. As an example, they may have an enlarged portion closer to one end than the other. It is necessary to insert pins with the correct orientation. The terminal pins are soldered to contact areas in a circuit and to obtain this in some examples, it is usual to position a solder preform over each pin.

SUMMARY OF THE INVENTION

The present invention provides an apparatus which feeds pins one at a time to an insertion position. A solder preform may or may not be positioned on the pin.

Broadly, the apparatus comprises means for feeding pins to an insertion punch, the punch gripping the pin. The punch then inserts the pin. In one arrangement, pins are fed one at a time down a chute into a shuttle. The shuttle moves the pin from the loading position to the insertion position. Solder preforms can be fed to a holding position such that a pin picks up a preform as it moves to the insertion position. The punch grips the pin and lifts it out of the shuttle, crimping the preform if present. The shuttle returns and the punch inserts the pin. In another arrangement, pins are fed on a bandolier and jaws pull a pin from the bandolier. The insertion punch grips the pin, the jaws retract and the punch inserts the pin.

Various sensors are positioned to detect presence of pins and other items at correct positions and with correct orientations. Safety overrides can be provided.

BRIEF DESCRIPTION OF THE DRAWINGS

The invention will be readily understood by the following description of certain embodiments, by way of example, in conjunction with the accompanying drawings, in which:

FIGS. 19, 20 and 21 are front, side and bottom views, respectively, of a lower part for the preform chute, to a larger scale;

FIGS. 22 and 23 are front and side views, respectively, of a cover for the lower part as in FIGS. 19, 20 and 21, and showing a deflecting finger;

FIGS. 24 and 25 are front and side views, respectively, of an assembled chute;

FIG. 26 illustrates the lower end of the chute to a much larger scale, showing positioning of a preform;

DETAILED DESCRIPTION OF THE DRAWINGS

Figure 1:
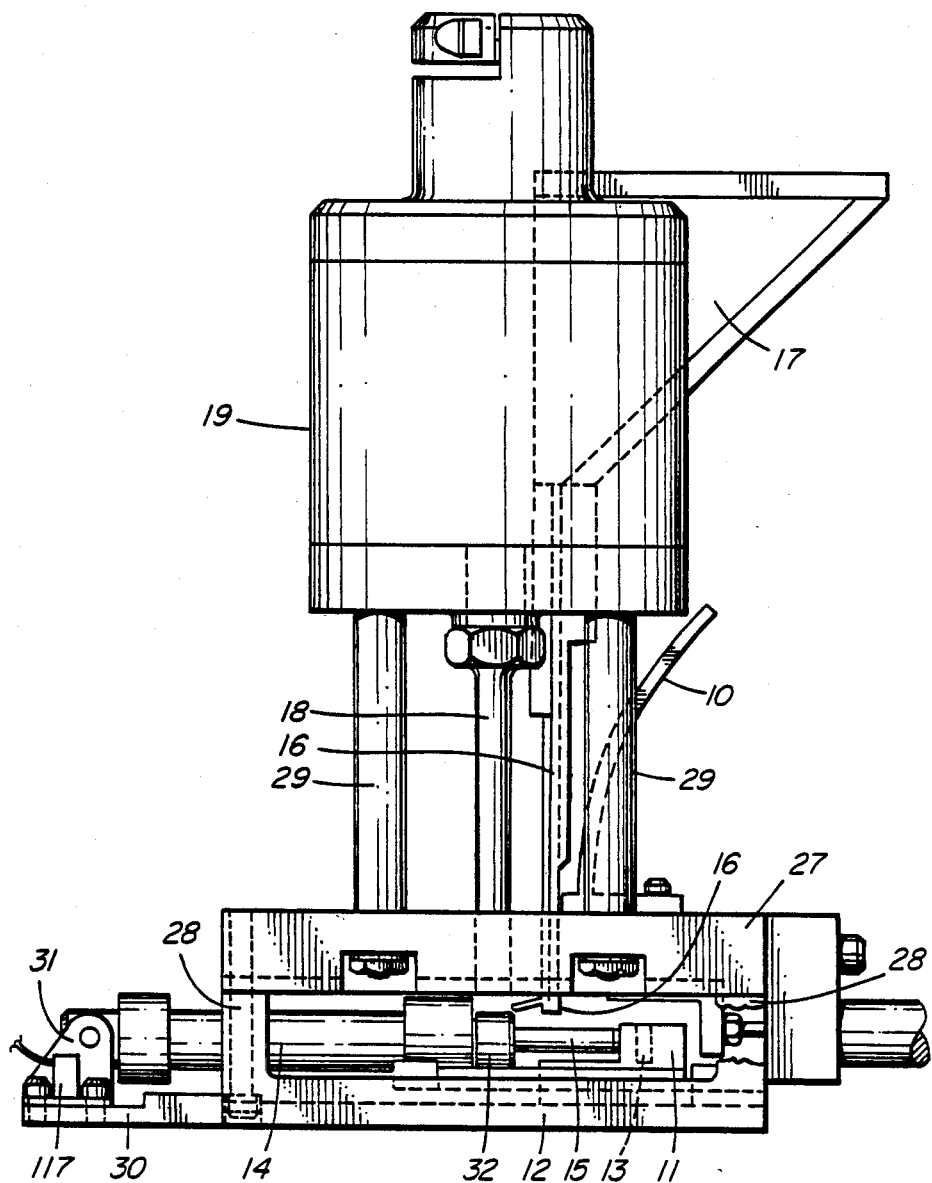
FIG. 1 is a side view of one form of insertion apparatus.
Figure 2:
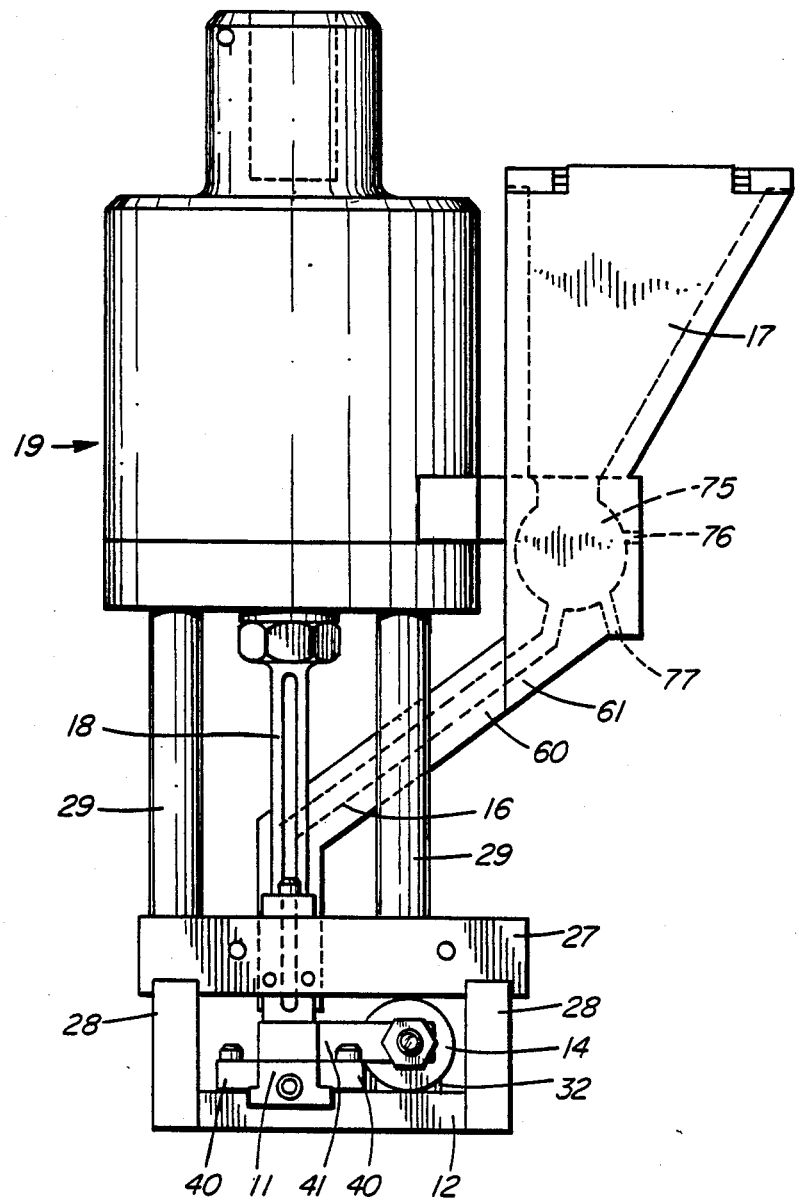
FIG. 2 is an end view of the apparatus in FIG. 1.

FIGS. 1 and 2 illustrate one form of tool generally for inserting pins which are 0.045" square. The pins are fed singly down a tube 10. A shuttle 11 reciprocates on a support member 12. The shuttle has a square bore 13 into which a pin drops from the tube 10. The shuttle is reciprocated laterally by an air cylinder 14 and rod 15. As the shuttle 11 moves to the left, in FIG. 1, it passes beneath a chute 16. Solder preforms are stored in a hopper 17 and feed down the chute 16. The preforms are fed "on edge" and the bottom preform is held such that the bore of the preform is at the height of the top of the pin. As the pin passes under the chute, it pushes the bottom preform, which then rotates over the top of the pin, falling down onto the pin. The pin may have a fluted portion and the solder preform moves down the pin until it rests at the top of the fluted portion. If there is no fluted portion, then the preform slides down until it rests on the top surface of the shuttle.

The shuttle, with the pin, continues to move until the pin is positioned below an insertion punch 18. Punch 18 reciprocates up and down, being moved by an air cylinder and piston indicated generally at 19. Punch 18 moves down over the pin, crimping the preform and picking up the pin, lifting it up out of the shuttle. The shuttle moves back and the punch moves down, inserting the pin into the component. As the shuttle moves back, a further pin drops into the bore 13.

Figure 3:
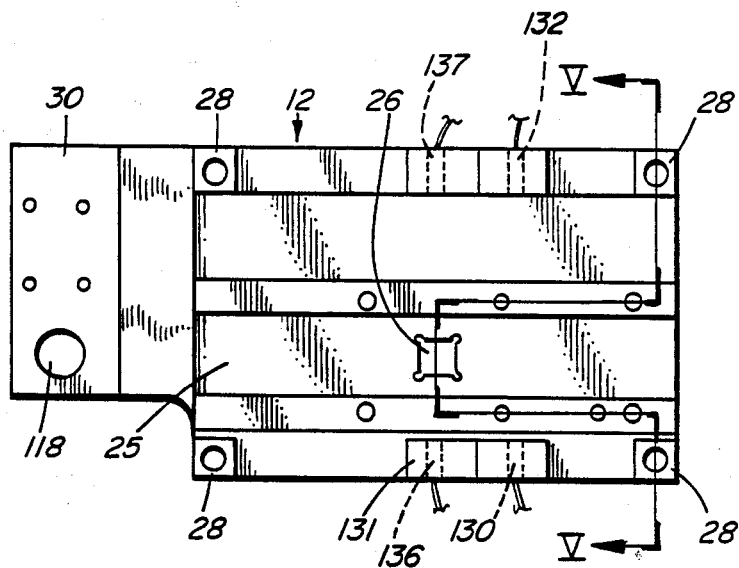
FIG. 3 is a top plan view of the support member to a larger scale.
Figure 4:
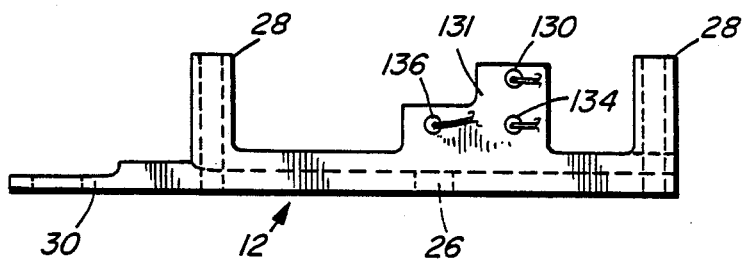
FIG. 4 is a side view of the support member in FIG. 3.
Figure 5:
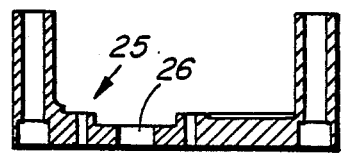
FIG. 5 is a cross-section on the line V—V of FIG. 3.

A top plan view of the support member 12 is seen in FIG. 3, with side and cross-sectional views in FIGS. 4 and 5 respectively. The shuttle 11 slides in a channel 25, approximately from the right hand end in FIG. 3 to a mid-position along the support member. An aperture 26 is formed in the support member and the punch 18 reciprocates through aperture 26, with the pin, on the down stroke, for pin insertion. A cap member 27 (FIGS. 1 and 2) is mounted on the support member, on the top of pillars 28 on the support member. The air cylinder and piston 19 are mounted on the cap member 27, by columns 29. A projection 30 on the support member has a bracket 31 mounted thereon, bracket 31 providing an end mounting for the cylinder 14. The cylinder 14 is also supported at the end remote from bracket 31, by a mounting member 32, attached to the support member 12. The cylinder 14 and rod 15 are offset from the channel 25 in the support member, along which the shuttle slides, as seen in FIG. 2.

Figure 6:
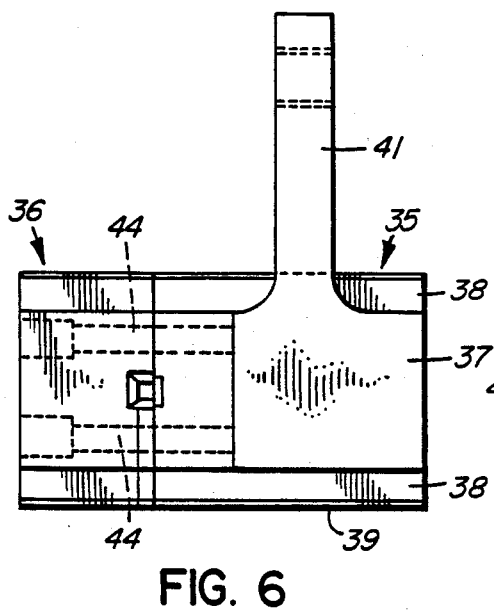
FIG. 6 is a top plan view of the shuttle.
Figure 7:
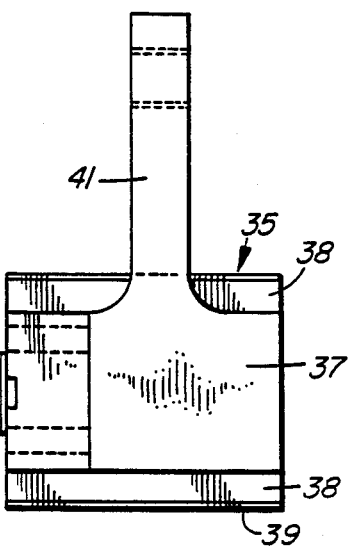
FIGS. 7, 8 and 9 are top plan view, side view and end view, respectively, of the main body part of the shuttle.
Figure 8:
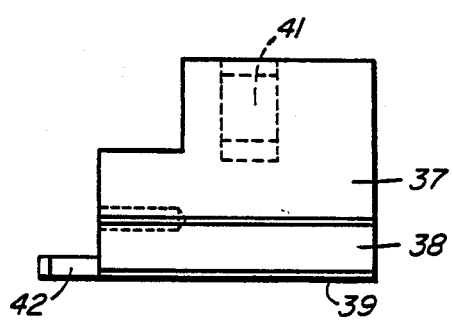
Figure 10:
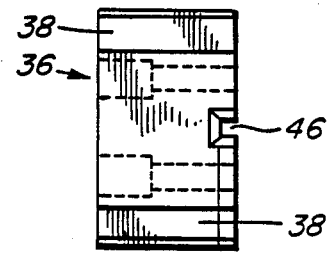
FIGS. 10, 11 and 12 are top plan view, side view and end view, respectively, of the minor body part of the shuttle.
Figure 11:
Figure 9:
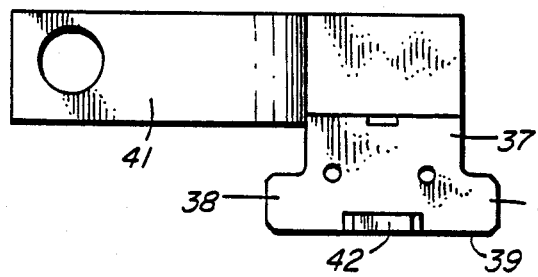
Figure 12:
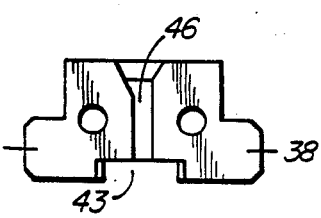

The shuttle 12 is seen in more detail in FIGS. 6 to 12. FIG. 6 is a top plan view of an assembled shuttle, FIGS. 7, 8 and 9 illustrating the main body part 35 and FIGS. 10, 11 and 12 illustrating a minor body part 36. The shuttle is made in two parts to ease the forming of the bore 13, which receives the pin. As seen in the various figures, the shuttle has an inverted Tee form with a central section 37 having a narrow flange 38 along each side. The shuttle slides on its bottom surface 39 and is held in the channel 25 of the support member 12 by holding members 40, seen in FIG. 2, which are mounted on the support member 12, one on each side of channel 25, and extend over the flanges 38. An arm 41 extends laterally from the shuttle, the rod 15 of the cylinder 14 being connected to the arm. The minor body part 36 is located on the main body part 35 by a tongue 42 extending from the main body part, the tongue fitting in a groove 43 in the minor body part. The two parts are held together by screws 44.

Formed in surface 45 of the minor body part 36 is a groove 46, which, when the two body parts are assembled together, forms the bore 13. The flanges 38 extend also along the sides of the part 36.

Figure 13:
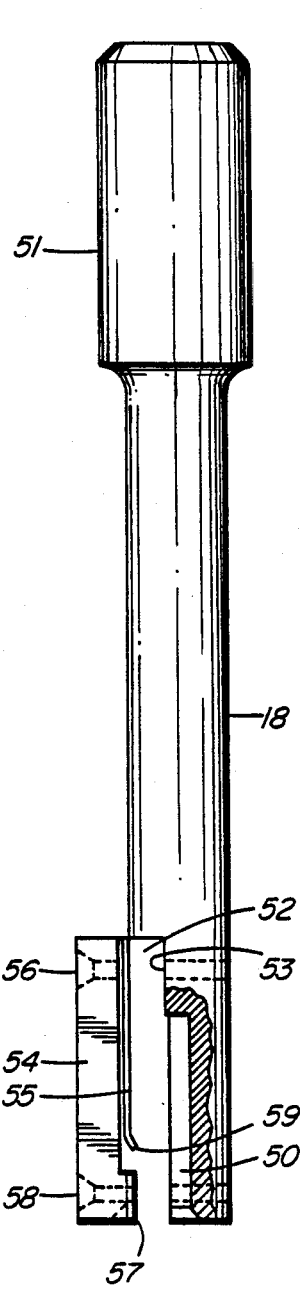
FIG. 13 is a side view of the insertion punch.
Figure 14:
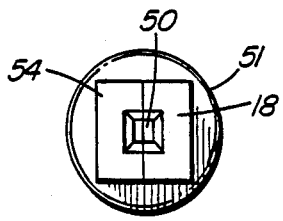
FIG. 14 is an end view of the insertion punch.

The punch 18 is seen in more detail in FIGS. 13 and 14, the lower end of the punch being partially cross-sectional, in FIG. 13, to show a pin receiving groove 50. The punch has an enlarged upper end 51, which is threaded for attachment to the piston of the cylinder and piston assembly 19. At its lower end the punch is recessed at 52 and a groove 50 is formed in the surface 53 of the recess.

Attached to the bottom of the punch, in the recess 52, is a cap member 54 and a flat spring member 55, shown removed from the punch in FIG. 13 for clarity. The cap member and spring are attached by a single screw at the upper end, at 56. At the lower end, the cap member has a projecting portion 57 which is slotted to match groove 50 and the cap member is attached at the lower end by two screws at 58. The spring member 55 has its lower end 59 bent slightly outward. With no pin in the punch, the end 59 extends into the groove 50. When a pin enters the punch, it pushes the spring member 55 back, the pin then held in the groove 50 by the spring member, but once the pin is inserted into a board, the friction of the spring member is overcome when the punch raises.

Figure 15:
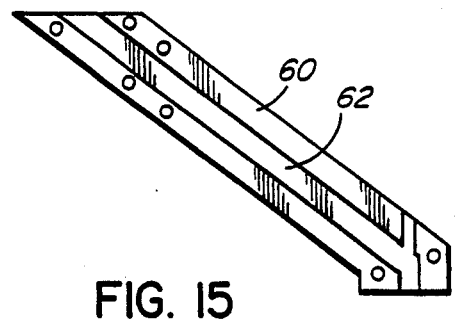
FIGS. 15 and 16 are side view and top view, respectively, of the main body part of the preform chute.
Figure 16:
Figure 17:
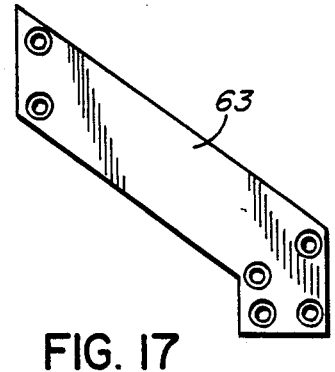
FIGS. 17 and 18 are side view and top view, respectively, of a cover for the body part in FIGS. 15 and 16.
Figure 18:
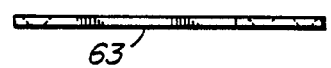

FIGS. 15 to 23 illustrate the various parts which form the preform chute 16, FIGS. 24 and 25 illustrate the assembled chute to a large scale, and FIG. 26 is an enlarged view of the bottom end of the chute as illustrated in FIG. 25. FIGS. 15 and 16 illustrate the main body portion 60. Portion 60 is attached to the output of the hopper 17, at 61 in FIG. 2, and is inclined downwardly to end above the preform loading position. There is an inclined groove 62 and a cover 63 (FIGS. 17 and 18) is attached to the portion 60 to cover the groove 62. At its lower end the portion 60 extends vertically. Extending down below the portion 60 is a further portion 64 having a groove 65 (FIGS. 19, 20 and 21). At the lower end of portion 64 there is a ledge 66 extending across the portion 64. The ledge closes the lower end of the groove 65, except for a vertically extending slot 67.

Slot 67 extends part way up groove 65 but is narrower than the groove. A cover 68 (FIGS. 22 and 23) attaches to portion 64 and closes the groove 65. At its lower end, the cover has a deflecting finger or member 69 extending outwardly and slightly downwardly. A slot 70 extends up from the lower end of the portion 64, aligned with slot 67. Slot 70 extends also through the deflecting member 69.

Solder preforms are stored in the hopper 17, passing down into an agitating zone 75 when the preforms are agitated by air. One air inlet is indicated at 76 and a second at 77. Inlet 76 is the normal inlet. Inlet 77 is used to increase agitation if it appears that jamming has occurred. The preforms pass into the chute 16, passing down grooves 62 and 65. The bottom preform rests on the inner ends 78 of the parts of the ledge 66 on either side of slot 67. A preform is indicated at 79, and is seen more clearly in FIG. 26. The preform stands "on edge" in the groove 65, held in place by the ledge 66. As a pin, indicated at 80 in FIG. 26, moves across on the shuttle, the top end of the pin is approximately level with the center of the bore 81 of the preform. The pin passes through slot 67 in portion 64 and contacts the preform. Continued movement of the pin pushes the lower part of the preform sideways. The preform is caused to pivot over, the pin end entering the bore 81. The deflecting member 69 ensures that the preform rotates over onto the pin and moves down the pin.

Figure 27:
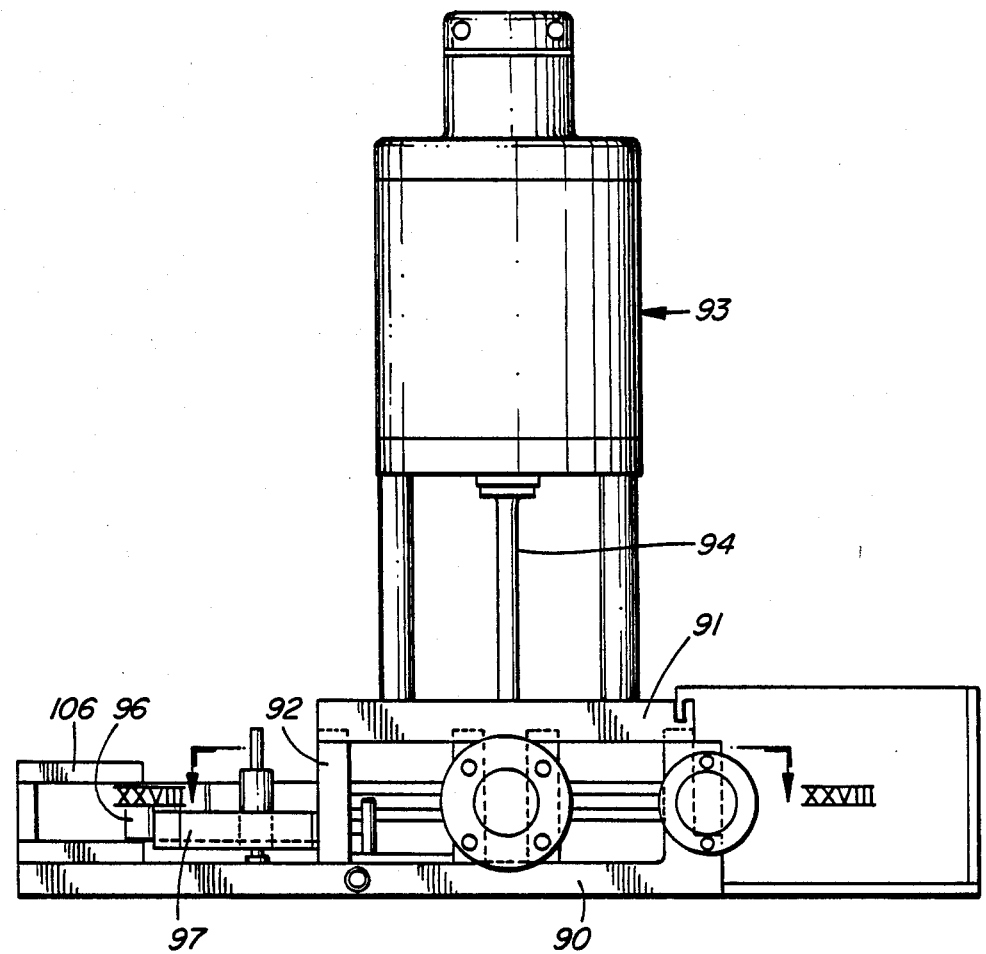
FIG. 27 is a side view of another form of insertion apparatus.
Figure 28:
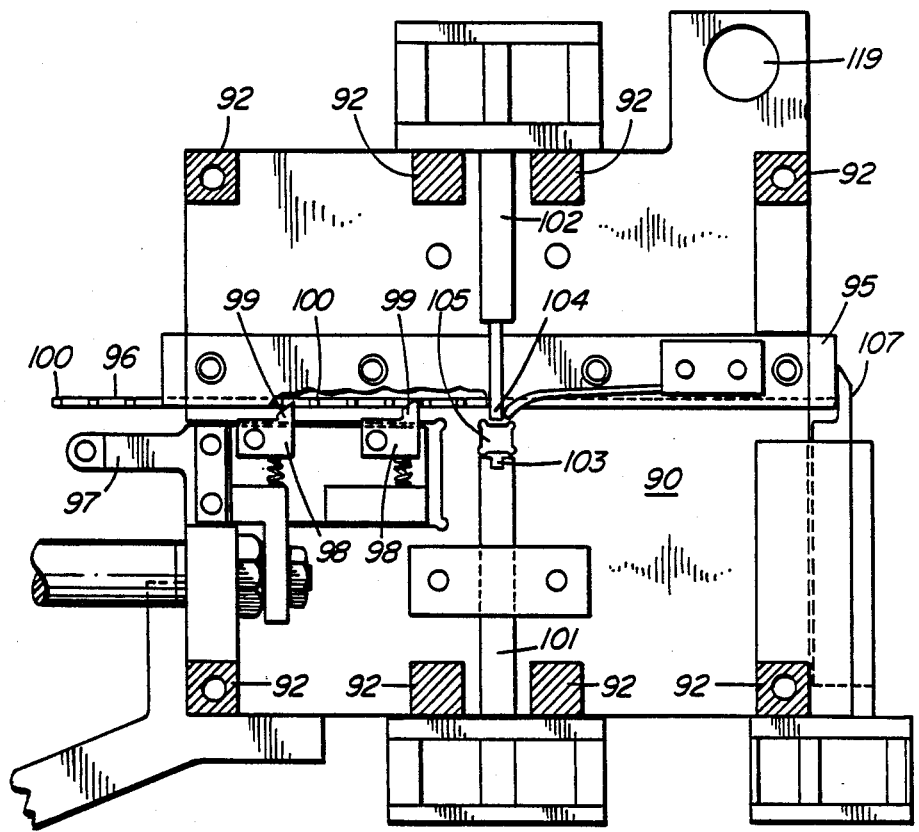
FIG. 28 is a cross-section on the line XXVIII—XXVIII of FIG. 27.

FIGS. 27 and 28 illustrate an alternative form of tool for inserting pins which are fed by a bandolier. As shown in FIG. 27, a support member 90 has a cap member 91 carried on pillars 92. On the cap member is mounted an air cylinder and piston assembly 93. An insertion punch 94 is mounted on the piston of the cylinder and piston assembly 93. Punch 94 is very similar to punch 18 in the example illustrated in FIGS. 1 and 2. A guide member 95 is mounted on the support member 90. Guide member 95 guides a bandolier 96 between the support member and the cap member.

A shuttle 97 has two spaced indexing members 98. Extensions 99 on the members 98 engage behind pins 100 on the bandolier 96. The shuttle reciprocates and feeds the bandolier step by step to sequentially position a pin between two jaws which remove the pin from the bandolier. This is seen in FIG. 28.

Mounted on the support member are two pneumatically operated rams 101 and 102, a ram on each side of the support member, and in axial alignment. The inner end of one ram, 101, has a slot 103 extending vertically normal to the axis of the ram. The inner end 104 of the other ram, 102, is approximately of a width equal to the width of the slot 103. The sequence of operation is as follows. Ram 102 is fully withdrawn and is clear of the bandolier 96. The bandolier is advanced and a pin 100 is positioned in alignment with the rams 101 and 102. The rams are advanced, with the opposed ends of the rams enclosing the pin. The pin is held in the slot 103 by the end 104. The ram 102 continues to advance, overriding the ram 103 and pushing it, and the pin, over an aperture 105 in the support member 90. Aperture 105 is aligned with the punch 94. The punch 94 moves down and grips the pin. The rams 101 and 102 retract and the punch 94 pushes the pin into the component. The punch 94 is withdrawn and the cycle repeats. The bandolier is fed from a reel 106. At the end of the support member 90, remote from the shuttle 97, a cut-off tool 107 can be provided to cut the empty bandolier into short lengths, as scrap.

The insertion tool as described above is mounted on a movable member, for example an arm, of an automated apparatus—often referred to as a robot. In the manufacture of backplane circuit boards for telecommunications switching apparatus, a large number of rows of pins are inserted, usually with the rows in pairs, a further circuit board being plugged into each pair of rows. Such backplane circuit boards can be made one at a time, a filled board removed and an unfilled board placed in position at the end of a complete insertion programme. As an alternative, a plurality of boards can be filled in one complete programme, the inserting tool then stopping. The filled boards are removed and new ones positioned, the cycle or programme then restarted.

Figure 29:
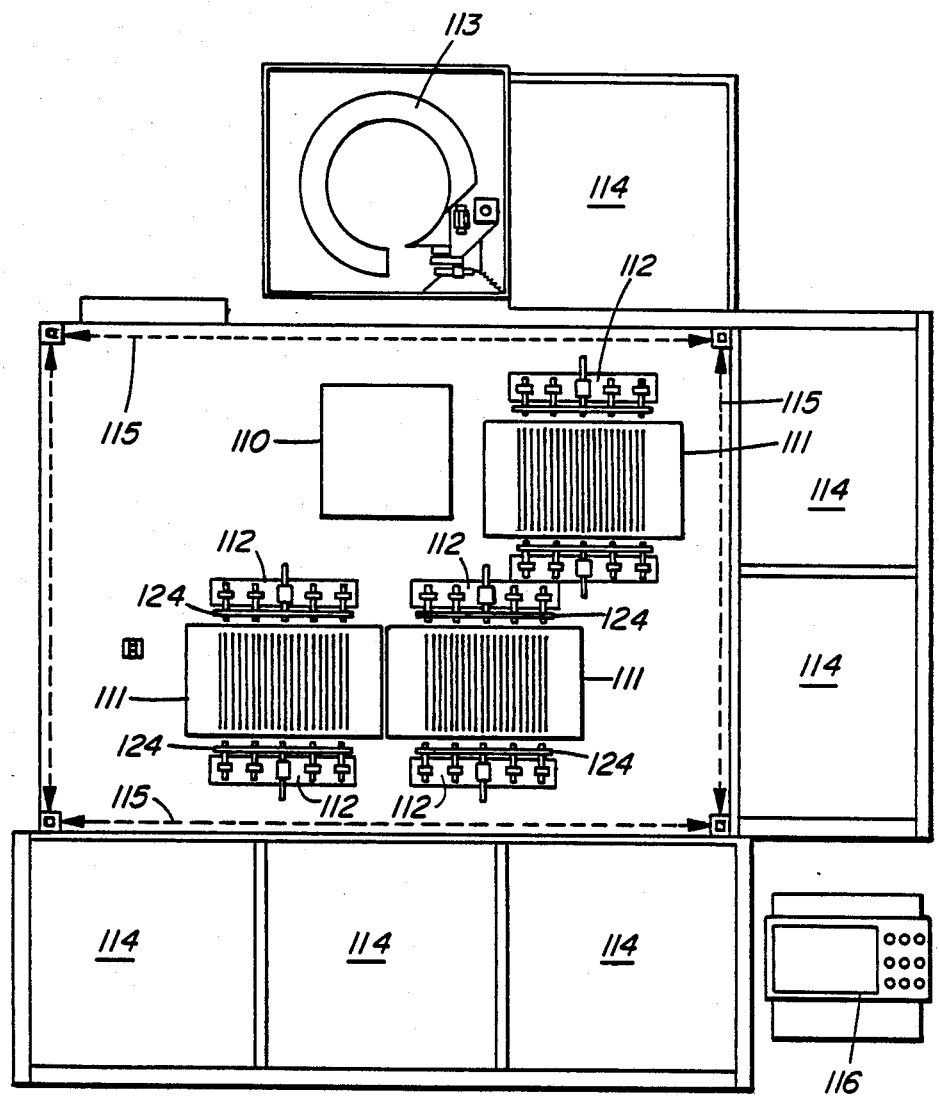
FIG. 29 is a plan view of an arrangement for inserting pins into a plurality of boards.

FIG. 29 is a diagrammatic plan view of one arrangement in which three pin insertion positions are provided. The main center column which carries the arm to which the insertion tool is mounted is indicated at 110. Three positions 111 for pre-insertion is provided. Clamping members 112 are provided at each of two opposed edges for each position 111. The pin feed apparatus is indicated at 113. For safety, two automatic stop provisions are made. Pressure sensitive pads 114 are placed on the floor around the apparatus so that anyone approaching the apparatus and stepping on a pad shuts off the apparatus. Also, light beams 115 are positioned around the apparatus at the level of the insertion tool itself and if a light beam is broken the entire apparatus stops. Once stopped, the apparatus can only be restarted by an operator. A control panel is indicated at 116.

Boards are manually loaded at each position 111. A single large board can be positioned at each station or position, or a plurality of smaller boards. At the start of a cycle, there is an optical inspection for presence of a board. Assuming a single board at each station or position, each board has a hole, usually at a corner, at a predetermined position. At each station 111, there are two pieces of reflective tape, at predetermined positions. Prior to starting pin insertion at each station, the robot moves the movable member so that an optical inspection device, indicated at 117 in FIG. 1, can view the tape position. The device 117 detects reflected light from the reflector tape and may contain an illuminator for the tape as well as a detector. The mounting hole is seen at 118 in FIG. 3, and also at 119 in FIG. 28 of the alternate arrangement. If it sees two tapes, then it knows no board is present. It can then move to another station and check that. If no board is sensed, then it moves back to a "home" position and stops. If a board is present, only one tape is seen through the hole in the board. The pre-insertion sequence then commences. If no tapes are detected, the insertion apparatus will not be actuated and the apparatus moves to the next station. If more than one board is positioned at each station, then an optical checking arrangement is provided for each board.

Figure 30:
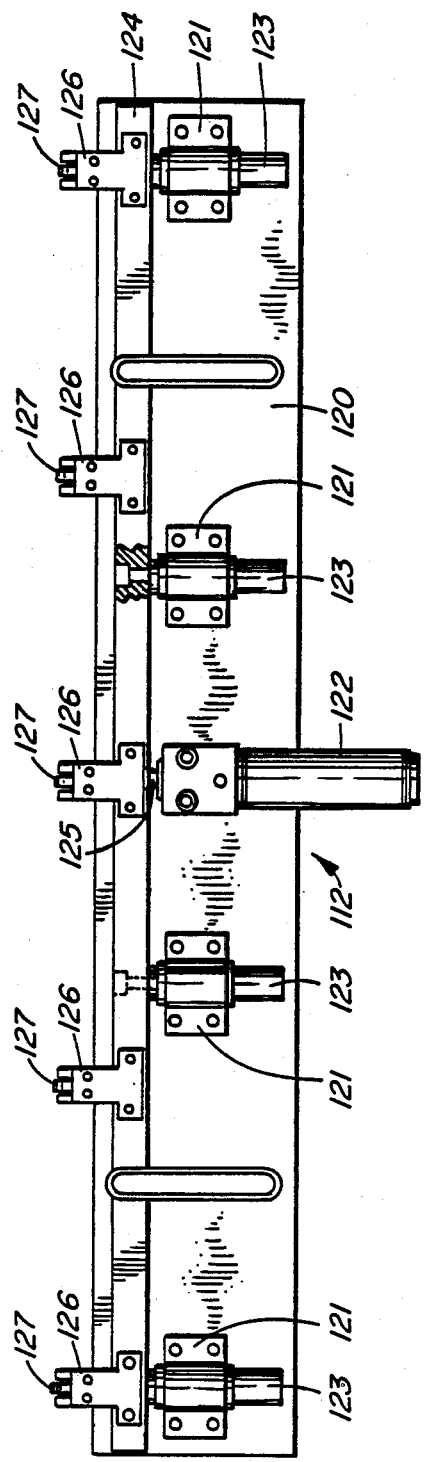
FIG. 30 is a plan view of a board clamping member.
Figure 31:
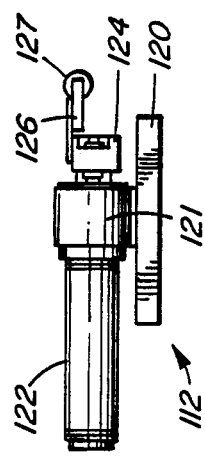
FIG. 31 is an end view of the clamping member in FIG. 30.

A clamping member 112 is illustrated in more detail in FIGS. 30 and 31. In the example illustrated in FIGS. 30 and 31, the clamping member has a baseplate 120 on which are mounted four guide members 121 and a pneumatic cylinder 122. Shafts 123 axially slidable in the guide members 121 are interconnected at the front ends by a transverse beam 124. The pneumatic cylinder is also connected to the beam 124 by a rod 125 extending from a piston in the cylinder 122. Attached to the front edge of the beam 124 are fine brackets 126, each bracket carrying a roller 127, the axis of each roller extending parallel to the beam 124. Once a board is in position at an insertion position or station 111, the pneumatic cylinders at each side of the station are actuated. The rollers 127 are moved forward over the opposite edges of the board, and hold it down in position.

Various checks are made in the insertion sequence to ensure that various items are in position, in a correct manner. For example, the top and bottom ends of a pin are checked when the pin is in the shuttle 11. This is obtained by mounting light emitters in the support member 12 on one side and mounting detectors on the other side. The presence or absence of a solder preform is also checked by a light emitter and detector. If a pin is not positioned correctly in shuttle 11, the shuttle is vibrated to attempt to make the pin move down in the shuttle. If a solder preform is not present, additional air agitation via inlet 77 is used to remove any blockage. If the attempts to correctly position a pin, and/or a preform, are not successful, the cycle stops and an indicator light comes on. The position of the preform on the pin is also checked and if the preform is not correctly positioned, or is absent, the apparatus moves the insertion tool over to a pin gripping mechanism which pulls the pin out of the punch 18.

Light emitters and detection are illustrated in FIGS. 3 and 4. An emitter 130 is positioned in side member 131 and a detector 132 is positioned in the opposite side member 133. This emitter and detector arrangement ensures that there is a clearance between the upper end of a pin in the shuttle and the bottom end of the shute. An emitter 134 at one side and a detector 135 at the other detects that a pin is in the shuttle. An emitter 136 at one side and a detector 137 at the other determines that a preform is on the pin after the shuttle moves. Also, the presence of a preform at the bottom of the preform shute is checked. As illustrated in FIGS. 19, 20 and 21, an emitter 138 is positioned in a small hole 139 at one side of portion 64 and a detector 140 is positioned in hole 141 on the other side, the detector sensing light passing through a slot 142, or detecting lack of light, as when a preform is in position.

In the alternative form of apparatus, as illustrated in FIG. 28, a detector 145 is mounted on one side of the guide member 85, with a long small diameter tubular projection 146 which is aimed at an axis aligned with the aperture 105. Light reflected from a pin in position is detected via the projection 146. If no pin is present, no light is reflected and therefore the controller knows no pin is present. The cycle of advancing the bandolier, and rams 101 and 102, is repeated until a pin is detected in position and then the pin is inserted into the board.

A typical insertion sequence for the apparatus as in FIGS. 1 and 2 is as follows:

start cycle:

the programme checks for the correct tool on the robot, with warning if not correct;

the system air, pin feeder, preform feeder and board clamps are actuated;

the tool is moved to check correct platten, for supporting board, is in place; if not in place, goes to next platten or "home";

the tool is moved to insertion station and optical verification of board presence carried out; if no board, check next position, goes home if no board found;

the pin presence is checked; if no pin in shuttle feeder, pin is sent through feed tube 10;

moves to programmed insertion position;

checks pin tip sensor for clearance between pin tip and feed tube above shuttle; proper clearance indicates pin properly seated; if pin not properly seated, vibration applied;

checks preform presence sensor at feed chute; if preform not present, agitation applied to free jam;

shuttle moves through preform pick-up tool to a position under punch;

preform-on-pin sensor verifies preform presence on pin and rejects pin if no preform present;

feeder fixes next pin to be inserted into feed tube;

punch comes down, picks up pin and crimps preform;

sensor indicates pin is clear of shuttle;

shuttle retracts and moves to accept next pin as it arrives at end of tube;

pin delivery air shut off;

punch pushes pin and preform down to insert pin; and punch retracted.

The cycle repeats from the feeding of a pin into the shuttle until a board is completed. The tool is then moved to a new board, or if all boards completed, to "home". The above sequence is, of course, for the tool as in FIGS. 1 and 2. A different sequence occurs for a tool as in FIGS. 27 and 28.

What is claimed is:

1. A method of inserting pins into a component, comprising:

feeding pins singly to a shuttle member at a loading position; moving said shuttle member to a dispensing position with a single pin beneath an insertion punch; moving said insertion punch down to grip said pin; moving said insertion punch upward to remove said pin from said shuttle member; moving said shuttle member back to said loading position; and moving said insertion punch down to insert said pin in a component.

2. The method of claim 1, including positioning an annular solder preform over said pin while moving said shuttle member and pin from said loading position to said dispensing position.

3. The method of claim 1, including reciprocating said shuttle to feed pins on a bandolier; removing a pin from the bandolier for insertion by said insertion punch.

4. The method of claim 1, including detecting the correct positioning of a pin in said shuttle.

5. The method of claim 2, including detecting the positioning of a preform on said pin.

6. The method of claim 3, including detecting the positioning of a pin beneath the insertion punch.

7. The method of claim 2, including crimping said solder preform on said pin prior to removing said pin from said shuttle member.

8. Pin insertion apparatus comprising:

support means for supporting a component;

a pin insertion punch reciprocally mounted for movement towards and away from said support means;

a shuttle member reciprocally mounted for movement in a direction normal to the direction of movement of said insertion punch, from a dispensing position beneath said punch to a loading position laterally displaced from said punch, said shuttle member adapted to feed pins sequentially to said insertion punch;

means for feeding pins singly and sequentially to said shuttle member;

means for reciprocating said shuttle member;

means for moving said insertion punch to insert a pin after delivery by the shuttle member; and said insertion punch including pin gripping means at a lower end for gripping and removing a pin from said shuttle member.

9. Apparatus as claimed in claim 8 for inserting pins supplied on a bandolier, said shuttle member including means for moving said bandolier and pins to position a pin at a removal position, means for gripping a pin and removing it from the bandolier and positioning the pins beneath the pin insertion punch.

10. Apparatus as claimed in claim 9, said means for gripping a pin comprising two opposed rams, said rams movable in a direction normal to the direction of movement of said bandolier and to the direction of movement of said insertion punch, and means for moving said rams together in opposition to grip a pin and further move said rams and said pin laterally to position said pin beneath said insertion punch.

11. Apparatus as claimed in claim 8, including means for positioning an annular solder preform on a pin as said shuttle member moves from loading position to said dispensing position.

12. Apparatus as claimed in claim 11, said means for positioning a solder preform comprising:

a chute having an enclosed groove opening at a lower end, said groove being of a size and shape to hold annular preforms on edge, one above the other; a ledge extending across at a lower end of said chute to retain preforms in said groove; a slot extending through said ledge, said slot of a dimension to permit a pin to pass therethrough; and a deflecting member extending from said chute above said ledge, whereby on movement of said shuttle member from said loading position, an upper end of a pin will pass through said slot and engage a lower part of a solder preform, continued movement of the pin rotating said preform over the upper end of the pin and moved onto said pin by said deflecting member.

13. Apparatus as claimed in claim 12, said insertion punch including pin gripping means at a lower end, said pin gripping means adapted to crimp a solder preform onto a pin.

14. Apparatus as claimed in claim 8, including a detector means for detecting correct positioning of a pin in the shuttle member.

15. Apparatus as claimed in claim 11, including detector means for detecting the presence of a solder preform on a pin.

16. Apparatus as claimed in claim 9, including detector means for detecting correct positioning of a pin beneath the insertion punch.

* * * * *